US012692915B2

(12) United States Patent

Shahin

(10) Patent No.: US 12,692,915 B2

(45) Date of Patent: Jul. 28, 2026

(54) VEHICLE WHEEL BRAKE AND BRAKE COMPONENT HAVING AN EVAPORABLE MATERIAL

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 362 days.

(21) Appl. No.: 18/536,496

(22) Filed: Dec. 12, 2023

(65) Prior Publication Data

US 2024/0369114 A1 Nov. 7, 2024

(30) Foreign Application Priority Data

May 2, 2023 (DE) .......................... 102023204050.6

(51) Int. Cl.
*F16D 65/00* (2006.01)
*F16D 65/18* (2006.01)
*F16D 65/78* (2006.01)

(52) U.S. Cl.
CPC ......... *F16D 65/0037* (2013.01); *F16D 65/18* (2013.01); *F16D 2065/781* (2013.01)

(58) Field of Classification Search
CPC .. F16D 65/0037; F16D 65/18; F16D 65/0025; F16D 65/0068; F16D 65/84; F16D 2065/781; B60T 17/22
See application file for complete search history.

(56) References Cited

U.S. PATENT DOCUMENTS

| | | | | |
|---|---|---|---|---|
| 3,684,061 A | * | 8/1972 | Ogawa ................... | F16D 55/228 |
| | | | | 188/264 G |
| 4,313,869 A | * | 2/1982 | Littlefield ............. | F16D 69/025 |
| | | | | 523/156 |
| 4,604,604 A | * | 8/1986 | Mann ...................... | F16D 66/02 |
| | | | | 188/1.11 R |
| 5,106,520 A | * | 4/1992 | Salyer ..................... | F16D 69/02 |
| | | | | 524/8 |
| 5,132,065 A | * | 7/1992 | Christie ................ | F16D 69/026 |
| | | | | 523/156 |
| 5,254,380 A | * | 10/1993 | Salyer ..................... | F28D 20/02 |
| | | | | 126/246 |

(Continued)

FOREIGN PATENT DOCUMENTS

| | | |
|---|---|---|
| DE | 4205645 A1 | 8/1993 |
| DE | 19807392 A1 | 9/1998 |

(Continued)

OTHER PUBLICATIONS

DE OA Dated Nov. 30, 2023.

*Primary Examiner* — Henry Y Liu

(74) *Attorney, Agent, or Firm* — Harvest IP Law, LLP

(57) ABSTRACT

The invention relates to a vehicle wheel brake, comprising a material that is configured to evaporate when operating the vehicle wheel brake, and relates to a brake component for a vehicle wheel brake, wherein the brake component comprises a material that is configured to evaporate when operating the vehicle wheel brake, the brake component being one of a brake caliper housing, a brake pad carrier, a brake pad, or an electronic brake actuator, in particular a parking brake actuator.

10 Claims, 8 Drawing Sheets

(56) References Cited

U.S. PATENT DOCUMENTS

| | | | | | |
|---|---|---|---|---|---|
| 5,482,742 | A * | 1/1996 | Takamiya | F16D 69/02 | 188/251 A |
| 5,613,578 | A * | 3/1997 | Moseley | F16D 69/023 | 188/218 XL |
| 5,686,144 | A * | 11/1997 | Thebault | F16D 69/023 | 427/430.1 |
| 5,769,185 | A * | 6/1998 | Main | F16D 69/04 | 188/218 XL |
| 5,962,135 | A * | 10/1999 | Walker | C04B 35/83 | 264/29.4 |
| 6,284,074 | B1 * | 9/2001 | Braund | F16D 69/02 | 156/64 |
| 6,726,753 | B2 * | 4/2004 | Koucouthakis | F16D 69/023 | 106/14.12 |
| 6,886,668 | B2 * | 5/2005 | Koucouthakis | C04B 41/5092 | 188/218 XL |
| 6,935,470 | B1 * | 8/2005 | Smith, Jr. | F16D 65/12 | 188/218 XL |
| 8,084,089 | B2 * | 12/2011 | Meckel | F16D 65/12 | 427/255.7 |
| 8,789,665 | B2 * | 7/2014 | Gilboy | F16D 65/092 | 188/251 A |
| 9,709,109 | B2 * | 7/2017 | Fryska | F16D 69/023 | |
| 10,948,036 | B2 * | 3/2021 | Meckel | C23C 14/021 | |
| 11,493,101 | B2 * | 11/2022 | Kuemmerling | F16D 65/0031 | |
| 11,739,413 | B2 * | 8/2023 | Khan | C04B 41/009 | 427/249.5 |
| 11,796,021 | B2 * | 10/2023 | Kirkpatrick | C04B 35/62884 | |
| 12,398,770 | B2 * | 8/2025 | Svensson | F16D 65/0978 | |
| 12,448,679 | B2 * | 10/2025 | Khan | C04B 41/009 | |
| 2002/0167217 | A1 * | 11/2002 | Higgins | B32B 15/12 | 301/37.105 |
| 2003/0110949 | A1 * | 6/2003 | Fornof | B01D 46/003 | 55/504 |
| 2003/0214064 | A1 * | 11/2003 | Shin | C04B 35/62849 | 264/29.7 |
| 2004/0020728 | A1 * | 2/2004 | Koucouthakis | F16D 69/02 | 428/218 |
| 2004/0129510 | A1 * | 7/2004 | Koucouthakis | F16D 69/023 | 188/71.1 |
| 2006/0283673 | A1 * | 12/2006 | Lamport | F16D 65/10 | 188/251 R |
| 2008/0060892 | A1 * | 3/2008 | Beylerian | F16D 65/0006 | 188/250 R |
| 2008/0196985 | A1 * | 8/2008 | Meckel | F16D 65/127 | 188/218 XL |
| 2008/0196986 | A1 * | 8/2008 | Meckel | F16D 69/04 | 188/218 XL |
| 2009/0050423 | A1 * | 2/2009 | Meckel | F16D 65/12 | 188/218 XL |
| 2010/0065389 | A1 * | 3/2010 | Gilboy | F16D 65/092 | 29/428 |
| 2010/0072008 | A1 * | 3/2010 | Koucouthakis | C09D 1/00 | 188/218 XL |
| 2010/0129551 | A1 * | 5/2010 | Fryska | C04B 35/83 | 427/256 |
| 2012/0118686 | A1 * | 5/2012 | Meckel | F16D 69/027 | 427/249.17 |
| 2015/0034432 | A1 * | 2/2015 | Fryska | C04B 35/83 | 188/218 XL |
| 2016/0108981 | A1 * | 4/2016 | Meckel | F16D 69/027 | 427/523 |
| 2020/0063810 | A1 * | 2/2020 | Bourlon | F16D 65/183 | |
| 2020/0362928 | A1 * | 11/2020 | Meckel | F16D 65/128 | |
| 2020/0385852 | A1 * | 12/2020 | Khan | C04B 41/52 | |
| 2021/0239171 | A1 * | 8/2021 | Kirkpatrick | C23C 16/045 | |
| 2021/0323192 | A1 * | 10/2021 | Sin Xicola | F16D 69/028 | |
| 2022/0003286 | A1 * | 1/2022 | Meckel | C23C 14/345 | |
| 2022/0290727 | A1 * | 9/2022 | Svensson | F16D 65/0978 | |
| 2022/0381307 | A1 * | 12/2022 | Meckel | C23C 14/0635 | |
| 2023/0022799 | A1 * | 1/2023 | Takada | C09K 3/14 | |
| 2023/0067524 | A1 * | 3/2023 | Sin Xicola | B28B 1/14 | |
| 2023/0220893 | A1 * | 7/2023 | Meckel | C23C 14/14 | 188/218 XL |
| 2023/0220899 | A1 * | 7/2023 | Funamoto | F16D 69/026 | 188/218 XL |
| 2023/0341020 | A1 * | 10/2023 | Funamoto | F16D 69/026 | |
| 2023/0357917 | A1 * | 11/2023 | Khan | C04B 41/52 | |
| 2024/0309921 | A1 * | 9/2024 | Meckel | C23C 14/028 | |

FOREIGN PATENT DOCUMENTS

| | | |
|---|---|---|
| DE | 19824971 A1 | 12/1999 |
| DE | 102007035841 A1 | 2/2008 |
| DE | 102017202618 A1 | 8/2018 |
| EP | 2014352 A2 | 1/2009 |
| KR | 10-2250143 B1 | 5/2021 |
| KR | 10-2021-0081276 A | 7/2021 |

* cited by examiner

VEHICLE WHEEL BRAKE AND BRAKE COMPONENT HAVING AN EVAPORABLE MATERIAL

CROSS-REFERENCE TO RELATED APPLICATION

This application is based on and claims priority under 35 U.S.C. § 119 to German Patent Application No. 102023204050.6, filed on May 2, 2023 in the German Patent and Trade Mark Office, the disclosures of which are incorporated herein by reference.

TECHNICAL FIELD

The invention relates to a vehicle wheel brake and to a brake component for such a brake vehicle wheel brake. The vehicle wheel brake may in particular be a disc brake. The vehicle may be a road vehicle, such as a car, a truck or a bus.

BACKGROUND

In vehicle wheel brakes, the generation of brake dust is a known problem. Brake dust occurs in form of fine particles which are a hazard to human health and which pollute the environment. Therefore, several attempts have been made to limit the generation of brake dust. These, for example, focus on limiting drag torque resulting from an unintended contact between a brake pad and brake disc at an inactive brake, this unintended contact generating brake dust. Also, solutions for filtering brake dust within a vehicle wheel brake have been suggested, see e.g. WO 2021/160279 A1. Further prior art solutions dealing with brake dust in vehicle wheel brakes can be found in WO 2021/146563 A1, US 2021/0190156 A1, US 2021/0033157 A1, KR 10 2020 0120094 A and KR 10 2020 0111844 A.

While such solutions are effective to some extent, there still remains room for improvement. Accordingly, it is an object of the present invention to limit environmental impacts resulting from a generation of brake dust in vehicle wheel brakes.

SUMMARY

This object is solved by the subject matter according to the attached independent claims. Advantageous embodiments are set out in the dependent claims, in this description and in the Figures.

Accordingly, a vehicle wheel brake is suggested wherein the vehicle wheel brake comprises a material that is configured to evaporate when operating the vehicle wheel brake.

The vehicle wheel brake may be configured to brake at least one vehicle wheel. For example, it may comprise a braked member that jointly rotates with the vehicle wheel. Additionally, it may comprise a braking member that does not rotate jointly with the vehicle wheel. The braking member may be configured to contact the braked member for generating brake forces. There may be a vehicle wheel brake at least for each driven wheel of a vehicle. Generally, the vehicle wheel brake may e.g. be configured as a drum brake or as a disc brake. In the latter case, brake dust may more easily be emitted into the surroundings.

The evaporable material disclosed herein may heat up along with components of the vehicle wheel brake. This heating up may result from friction generated between a braking member of the vehicle wheel brake and a braked member. The resulting frictional thermal energy may be transmitted to other members of the vehicle wheel brake, e.g. by way of heat conduction, heat radiation or by an indirect transfer of heat. The latter may include that volumes of air heated up by the braked member contact (e.g. stream along) the evaporable material, thereby warming up said material.

The invention is based on the realisation that the heating up of components of the vehicle wheel brake can be used to deliberately evaporate at least one material or, put differently, at least one substance. This material may form a layer or a deposition at a surface of a component of the vehicle wheel brake. It may thus be provided externally to said component, but may alternatively also be an integral part of said component. The material may also be referred to as a material to be evaporated or as an evaporable material herein.

When evaporating, the material may e.g. form a gaseous phase or an aerosol that may at least initially stay close to and/or stream along at least part of the vehicle wheel brake. As a result, the evaporated material may gather fine brake dust particles that have been emitted by the vehicle wheel brake. For example, several brake dust particles may adhere to or be caught e.g. by a gas bubble, a gas stream, a vapour volume or aerosol volume each formed by the evaporated material. In consequence, a conglomerate and/or an accumulation of several brake dust particles may be formed.

This may result in an increase density compared to loosely distributed brake dust particles. Accordingly, the respective accumulation may form locally concentrated particulate matter that descends towards the ground. This prevent that the single brake dust particles are loosely dispersed into the surroundings. Thus, at least a share of the brake dust particles may gather at a road surface below of the vehicle. From there the brake dust particles may be washed away or otherwise removed instead of freely floating within the surroundings where they could be easily inhaled by humans. Also, this limits a risk of freely floating brake dust particles moving far away from road surfaces and into the open nature.

Therefore, the present solution advantageously provides a novel approach to brake dust management. At least according to embodiments, this approach may be implemented in vehicle wheel brakes at limited constructional changes, limited additional weight and limited additional costs.

According to one embodiment, an evaporation temperature of the material is between 100° C. and 300° C. and in particular between 120° C. and 250° C. It has been found that such an evaporation temperature can reliably be reached when operating the vehicle wheel brake.

Additionally or alternatively, a melting temperature of the material may not be more than 20° C. below of the evaporation temperature or may not be more than 40° C. below of the evaporation temperature. This ensures a quick change from a melting of the material to an evaporation thereof, thus avoiding liquified material dripping down from the vehicle wheel brake before being evaporated.

In one example, the material is provided at an outwardly facing surface of the vehicle wheel brake. For example, the face may be exposed and/or face into to the surroundings. In particular, the face may face away from a brake disc and/or from a centre of the vehicle. Instead, it may face towards other road participants and/or towards a road surface. This helps to ensure that the evaporating material spreads into the surroundings, thereby catching brake dust that is blown e.g. by a rotating brake disc in similar directions.

Non-limiting examples of respective outwardly facing surfaces include a surface located at a finger side of the brake caliper housing as well as outer surfaces of a bridge section of the brake caliper housing and/or of a bridge section of a brake pad carrier.

Additionally or alternatively, the material may be provided at a surface facing a brake disc of the vehicle wheel brake. This surface may in particular be comprised by a bridge section of a brake caliper, e.g. of a brake caliper housing of a floating brake caliper. In a generally known manner, brake calipers may reach around a brake disc and/or comprise portions that are arranged adjacent to both side faces of a brake disc. These portions are often referred to as a finger portion (or finger side) and piston portion (or piston side) of the brake caliper. A bridge section connects these portions (or sides) to one another by extending from one side face of the brake disc to the other. By doing so, a (e.g. radially inner) surface of the bridge section may face a circumference of the brake disc. The material to be evaporated as disclosed herein may be in particular be deposited at this surface.

According to a further embodiment, the material is configured to form bubbles when evaporating. This is advantageous in that the bubbles may stay afloat for e.g. several seconds. Accordingly, they may gather a large number of brake dust particles during said time span. Also, the bubbles have a large surface area to which a plurality of dust particles may adhere.

Additionally or alternatively, the material may be configured to form a vapour or an aerosol when evaporating. The vapour and/or aerosol may comprise fine particles at which the dust particles may accumulate. This way, large volumes of accumulating particular matter may be formed that quickly descend to the ground.

In sum, any of the vapour or aerosol as well as the bubbles discussed above may have a binding effect by means of which loosely floating fine brake dust particles can be concentrated and directly or indirectly be bound together.

According to a further aspect, the material is comprised by a (in particular local) coating applied to (e.g. only part of) at least one component of the vehicle wheel brake. This coating may have no specific effect apart from comprising the evaporating material. Specifically, the coating may not be a paint, a clear coat or a varnish used to coat and protect and/or colour the component as such. Rather, the coating comprising the evaporating material may only locally be applied to a component that has already painted or clear coated or varnished.

Alternatively, the evaporating material may be comprised by a paint or a clear coat (or varnish) applied to at least one component of the vehicle wheel brake. This may concern a paint, clear coat or varnish (and in particular the only pain, clear coat or varnish) used for coating and/or colouring a majority of or even the entire component. The evaporating material may be an integral part of this paint, clear coat or varnish. It may thus be distributed (in particular uniformly) over a larger surface area and in particular over the entire surface of the component compared to providing the local coating discussed above. The paint, clear coat or varnish may provide an anti-corrosion effect.

By including the material in a coating or paint of any of the above kinds, it can be precisely deposited on a brake component at limited or no constructional changes of said component and at a limited additional weight.

The material may e.g. be one of the following:

A partial anodizing or hard anodizing coating which may e.g. be applied as part of a galvanization process, e.g. as a selective galvanic coating. It may e.g. evaporate at approximately 150° C. An example of such a material is available under the name "Selga-Coat" from Aalberts Surface Technologies GmbH, Kerpen (Germany).

A fluoropolymer material which may e.g. form bubbles when evaporating and that may e.g. evaporate at approximately 180° C. An example of such a material is available under the name "TempCoat" from Aalberts Surface Technologies GmbH, Kerpen (Germany).

Generally, the material may be solid (e.g. stiff) when not operating the vehicle wheel brake and/not reaching its evaporating temperature. For example, the material may be solid up to at least 50° C. or up to at least 100° C. This way, the material can be reliably positioned at the vehicle wheel brake.

According to one embodiment, the material may be a liquid material or a grease-like material that is deposited in at least one reservoir of the vehicle wheel brake (e.g. forming or being formed by a container). The reservoir may also be referred to as a liquid reservoir. In this case, a melting temperature (or freezing temperature) may be below 0° C., e.g. below −20° C. The liquid or grease-like material may e.g. comprise a natural or synthetic oil. The reservoir may e.g. have openings, valve structures or a membrane to ensure that evaporated material can be released into the surroundings, while non-evaporated material stays in the reservoir. The reservoir may e.g. be metallic or comprise another material that is highly heat conductive to promote the evaporation.

The liquid material or grease-like material may have a lower evaporating temperature and/or evaporate more reliably than a solid material. Also, a larger volume of the liquid material or grease-like material can be provided when stored in a reservoir compared to a solidified material that is e.g. coated onto a brake component.

A grease-like material may have a higher viscosity than a liquid material (e.g. at least twice as high or at least five times as high). Contrary to a liquid, the grease-like material may be able to sustain a given shape on its own and e.g. without structural support from surrounding container walls.

The (liquid) reservoir may be arranged in and/or may be formed by a recess that is comprised by at least one component of the vehicle wheel brake. This way, projections or other obstacles formed by the liquid reservoir may be limited. For example, in case the liquid reservoir is a container that is to be arranged in the recess, the recess may be large enough to receive a large share and in particular the whole container. Accordingly, the container may be flush with surrounding surfaces of a brake component of the vehicle wheel brake. Moreover, by arranging the liquid reservoir in a recess, heat can be efficiently conducted to the material via a plurality of sides of the reservoir to achieve a reliable evaporation.

According to a further embodiment, the material is comprised by an adhesive member that is adhered at least one component of the vehicle wheel brake. For example, the adhesive member may be a sticker, an adhesive strip and/or may generally be a (in particular manually) removable member. The material that is to be evaporated may be an integral component of the adhesive member. For example, it may form a layer and/or a coating of said member. Additionally or alternatively, the adhesive member may be soaked or impregnated with the evaporable material.

Providing an adhesive member comprising the material to be evaporated may help to limit production efforts and associated costs. Also, the adhesive member may be frequently replaced during maintenance to restore the brake dust catching function provided by the evaporating material.

The invention also relates to a brake component for a vehicle wheel brake, wherein the brake component comprises a material that is configured to evaporate when operating the vehicle wheel brake, the brake component being one of:

a brake caliper housing, a brake pad carrier, a brake pad, in particular at a backplate thereof, an electronic brake actuator, in particular a parking brake actuator.

It has been determined that these components provide suitable surface areas that may reliably reach sufficiently high temperatures. Said temperatures may surpass an evaporating temperature of the material. For example, said surface areas may be exposed to hot air streams from a brake disc or brake drum of a vehicle wheel brake. These air streams may increase at least a surface temperature of the components above an evaporating temperature of the material that is to be evaporated.

The brake caliper housing may also be referred to as a caliper frame. The brake caliper housing may be configured to push at least one brake pad towards a braked member. The braked member may in particular be a brake disc of a vehicle disc brake. The brake caliper housing may be configured to receive a brake piston and/or to house at least part of a (e.g. electric or hydraulic) brake actuating mechanism. Also, the brake caliper housing may be movable according to known floating caliper principles.

The brake pad carrier may be configured to carry and/or guide the brake pads, e.g. when being displaced towards and away from the brake disc. For example, the brake pad carrier may comprise guiding grooves in which guiding projections (e.g. so-called guiding ears) of at least one brake pad are received. The brake pad carrier may be stationary, e.g. due to being fixed to a non-movable axle knuckle. The brake caliper housing may move relative to the brake pad carrier and e.g. slide along guide pins that are fixed to the brake pad carrier.

The brake pad may comprise an (in particular metallic) backplate. At a side of the backplate facing a brake disc of the vehicle wheel brake, a friction material (in particular a friction lining) may be provided to contact the brake disc.

The electronic brake actuator may be configured to move a brake piston independently of any hydraulic activation thereof to activate and release the brake, e.g. when parking the vehicle.

BRIEF DESCRIPTION OF DRAWINGS

Embodiments of this disclosure are discussed in the following with respect to the attached schematic Figures. Throughout the Figures, same or corresponding features may be marked with same reference signs.

DETAILED DESCRIPTION

Figure 1:
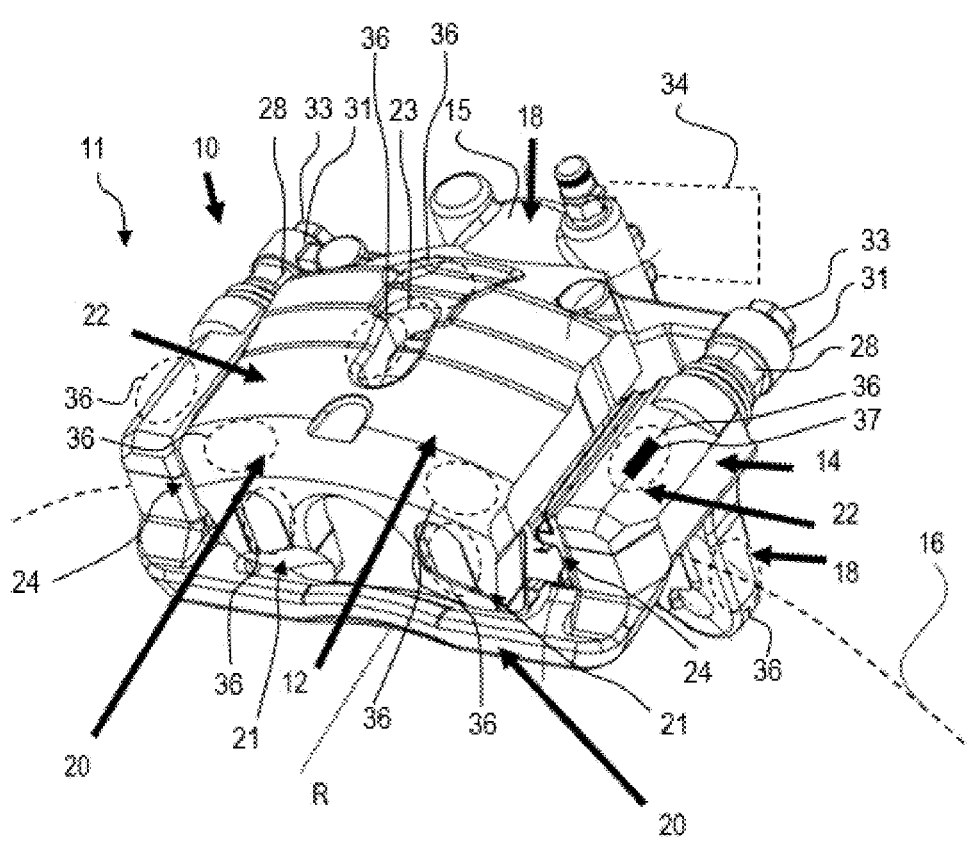
FIG. 1 is a perspective view of a vehicle wheel brake according to a first embodiment of this disclosure.

FIG. 1 shows a brake caliper assembly 10 of a vehicle wheel brake 11 in form of a disc brake according to a first embodiment of this disclosure. The brake caliper assembly 10 is configured according to generally known floating caliper principles. It comprises a brake caliper housing 12 that is slidingly supported by a stationary brake pad carrier 14.

The brake caliper assembly 10 is generally configured to press brake pads 26 (one of which is partially visible in FIG. 1) against a brake disc 16. The brake pads 26 are received in and guided by the brake pad carrier 14. Only part of an outer circumferential edge of the brake disc 16 is indicated by a dashed line in FIG. 1, the brake disc 16 generally being configured according to known examples. Further, a rotation axis R about which the brake disc 16 rotates is schematically indicated by a dotted line in FIG. 1.

The brake caliper housing 12 comprises a receiving section 15. Only an outer wall of said receiving section 15 is visible in FIG. 1 and the receiving section 15 is formed as an (non-visible) open cylindrical cavity. In said receiving section 15, a non-illustrated brake piston is received (cf. brake piston 19 in FIG. 1a).

The brake caliper housing 12 comprises a piston side 18 located at a first side face of the brake disc 16 and specifically at the same side face as the receiving section 15. Further, the brake caliper housing 12 comprises a finger side 20 located at the respective opposite side face of the brake disc 16 compared to the piston side 18. The finger side 20 comprises (merely as an example) two finger portions 21 according to known configurations.

The finger side 20 and the piston side 18 are connected to one another by a bridge section 22. The bridge section 22 overlaps with the outer circumferential surface of brake disc 16 or, put differently, axially spans across the brake disc 16 and/or extends from one of the side faces of said brake disc 16 to the other.

Figure 2:
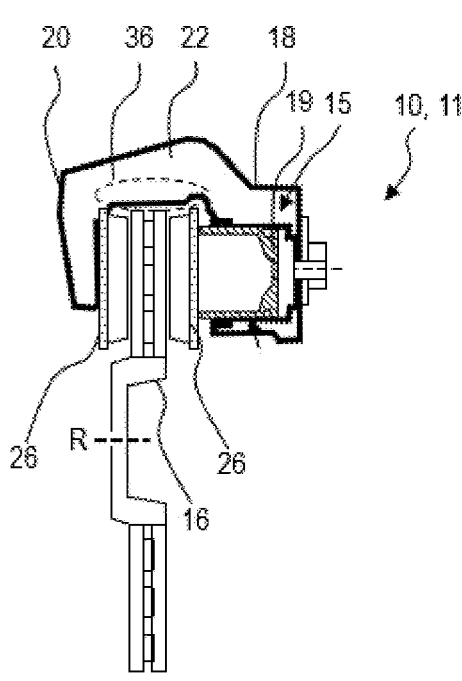
FIG. 2 is a schematic cross-sectional view of part of the vehicle wheel brake according to the first embodiment.

In a generally known manner, the brake piston received in the receiving section 15 and the inside of the finger portions 21 that face away from the viewer in FIG. 2 are configured to rest against the brake pads 26 and to press them against the brake disc 16.

Just like the brake caliper housing 12, the brake pad carrier 14 comprises a piston side 18, a finger side 20 and a bridge section 22. Guiding grooves 24 of the brake pad carrier 14 are provided at an inner side of the bridge section 22 for slidingly receiving the two brake pads 26, one of said guiding grooves 24 being partially visible in FIG. 1. The brake pads 26 are located on opposite side faces of the brake disc 16. The brake pads 26 are generally identical to one another, but are oriented differently to face the different side faces of the brake disc 16.

FIG. 1 also illustrates that the movable brake caliper housing 12 is slidingly supported by and guided relative to the brake pad carrier 14 by means of guide pins 28. These are located on both of a trailing side and leading side of the brake caliper assembly 10.

According to the configuration of FIG. 1, the guide pins 28 are each received in a non-illustrated cylindrical blind hole in the brake pad carrier 14. An axial length of said blind holes exceeds that of the guide pins 28, so that the latter may axially slide back and forth within the blind holes.

The guide pins 28 are secured to the brake caliper housing 12 by means of a screw connection. Specifically, fixing projections 31 are provided at each of a trailing side and a leading side of the brake caliper housing 12, said fixing projections 31 each comprising a non-visible through-hole. A guide pin 28 is aligned with each of said through holes to engage with a locknut 33 provided at an opposite side of the fixing projections 31. This way, the guide pins 28 are mechanically fixed to the fixing projections 31 and thus to the brake caliper housing 12.

The brake caliper assembly 10 further comprises an electric actuator 34 that is highly schematically illustrated on a rear side of the receiving section 15. This electric actuator 34 may displace a brake piston received in the receiving section 15 for a controlled activation and release of the brake. This may in particular be done to activate a parking brake function.

FIG. 1 shows a number of schematically illustrated areas in which a material 36 is deposited, this material 36 being evaporable when operating the vehicle wheel brake 11. It can be seen that the material 36 can be provided at a number of external surfaces of the brake caliper assembly 10 each facing away from the brake disc 16. Specifically, the material 36 may be deposited at outwardly facing surfaces of the finger portions 21 and/or at other outwardly facing surfaces at the finger side 21 of the brake caliper housing 12. Also, the material 36 may be deposited at surfaces of the bridge section 22 of the brake pad carrier 14. Further illustrated is a possible position of the material 36 at inner surfaces of an optional through hole 23 in the bridge section 22 of the brake caliper housing 12. Still further, possible positions of the material 36 at the piston side 18 of the brake caliper housing 12 and brake pad carrier 14 are indicated.

In any of the respectively marked areas, the evaporating material 36 is effective for reaching streams of fine brake dust particles that are emitted into the surroundings when braking.

FIG. 2 is a schematic cross-sectional view of the embodiment of FIG. 1 without including all details of FIG. 1 (e.g. not showing the brake pad carrier 14). A sectional plane of FIG. 1a comprises the rotation axis R. In this FIG. 2, the brake pads 26 and brake disc 16 as well as a brake piston 19 can more clearly be seen. Further, an additional preferred area for positioning the material 36 is indicated. This area is an inner surface of the bridge section 22 of the brake caliper housing 12. Said inner surface faces the brake disc 16 and specifically an outer circumference thereof.

It is to be understood that the presently disclosed solution is not limited to floating brake calipers as indicated in FIGS. 1 and 2. Rather, it may also be provided in drum brakes and/or in fixed caliper brakes, such as double piston brakes where brake pistons are located on both sides of a brake disc. In the latter case and similar to FIG. 1a, the material 36 may in particular be deposited at an inner surface of a bridge section facing the brake disc 16.

Figure 3:
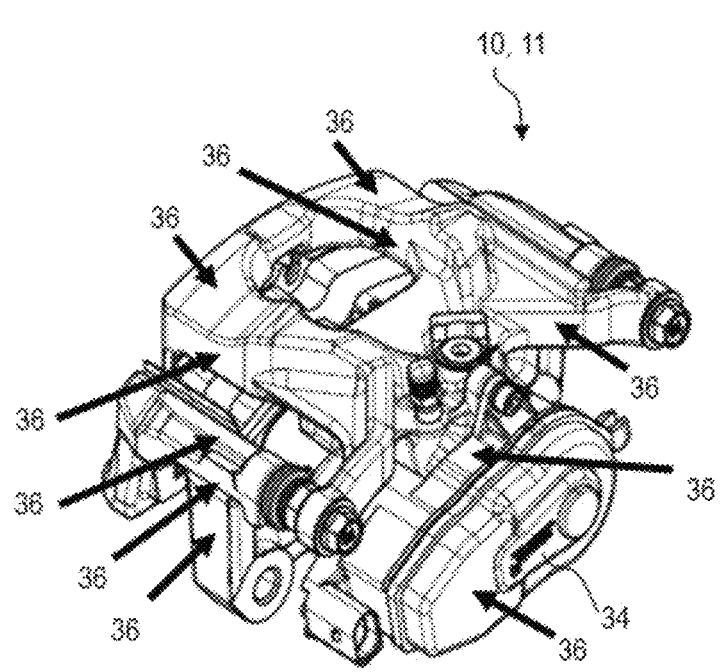
FIG. 3 is a perspective view of a vehicle wheel brake according to a second embodiment of this disclosure.

FIG. 3 illustrates another embodiment of a vehicle wheel brake 11 that is configured as a disc brake. This embodiment only slightly deviates from the one of FIGS. 1 and 2. Compared to FIG. 1, FIG. 3 shows a rear view in which the electric brake actuator 34 (that is illustrated in more detail in this Figure) faces the viewer.

In FIG. 3, suitable areas for arranging the material 36 are indicated by arrows. It can be seen that also outer surfaces of the electric brake actuator 34 can be used to deposit the material 36 thereat.

A principle of depositing the material 36 is not particularly limited in case of FIGS. 1, 2 and 3. For example, the material 36 may be deposited as part of local coatings in the respectively marked areas. Additionally or alternatively, adhesive members 37 (see FIG. 1) e.g. in form of stickers may be provided, these adhesive members 37 comprising the material 36.

Figure 4:
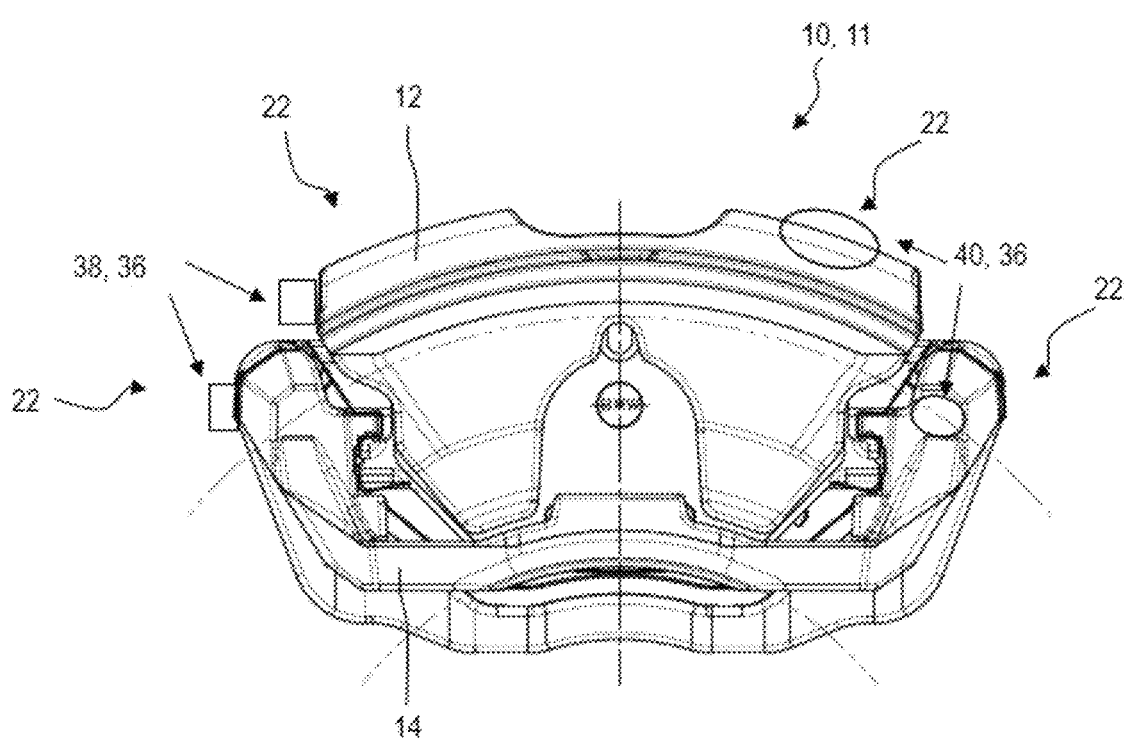
FIG. 4 is a view of a vehicle wheel brake according to a third embodiment of this disclosure, the vehicle wheel brake comprising a liquid reservoir.

FIG. 4 shows a further embodiment of the invention. Said Figure essentially corresponds to a front view of the brake caliper assembly 12 of FIG. 1. In this embodiment, the material 36 is comprised by a liquid reservoir 38 in form of liquid containers that are externally attached to components of the brake caliper assembly 12. Exemplary positions of the liquid reservoirs 38 are indicated at outwardly facing and/or lateral surfaces of the bridge sections 22 of the brake caliper housing 12 and brake pad carrier 14. Only one or any other number of liquid reservoirs 38 may be provided.

Additionally or alternatively, positions of recesses 40 are indicated in FIG. 4 in each of which liquid reservoirs 38 may be arranged. This is discussed in further detail with respect to FIGS. 5 and 6 below. The illustrated positions of the recesses 40 are only by way of example. Again, they are located at the bridge sections 22 of the brake pad carrier 14 and brake caliper housing 12.

Contrary to FIG. 4, only the externally attached liquid reservoirs 38 or only recesses 40 may be provided.

Figure 5:
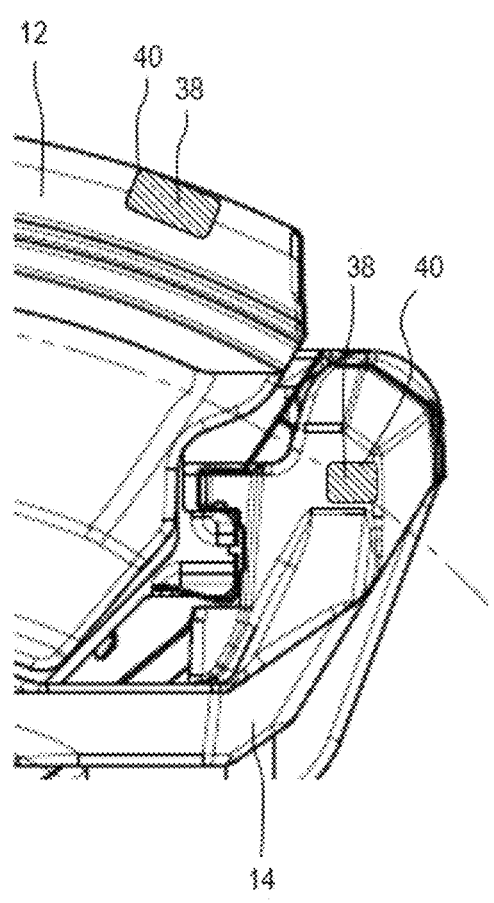
FIGS. 5-6 are views of further embodiments of this disclosure comprising recesses for receiving liquid containers.

FIG. 5 shows the position of the recesses 40 in further detail. The recesses 40 are illustrated highly schematically. They may be formed as (in particular cylindrical) cut-outs or indentations. The extents of the recesses 40 illustrated in FIG. 5 correspond to cross-sectional areas of the recesses 40. These areas indicate a depth with which the recesses 40 extend into a volume of the brake caliper housing 12 and brake pad carrier 14.

Figure 6:
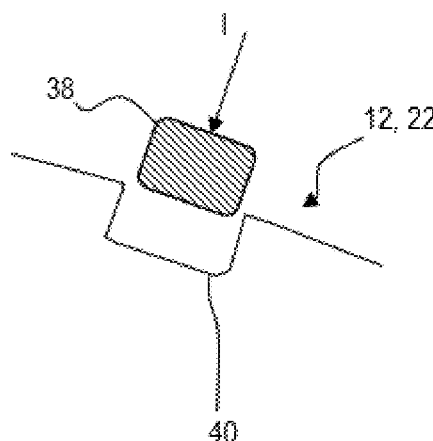

FIG. 6 schematically illustrates an insertion of a liquid reservoir 38 into the upper recess 40 of FIG. 5 according to an arrow I. As correspondingly illustrated in FIG. 5, the container 38 is flush with a surrounding surface of the brake caliper housing 12 once inserted. This avoids any protrusions that may form edges and/or obstacles at said surface.

It is noted that the liquid reservoir 38 does not necessarily have to be provided in form of a dedicated container that is e.g. inserted into a recess 40. Rather, the recesses 40 may form liquid reservoirs 38 as such. In this case, the liquid may directly be deposited in said recesses 40. Preferably, the liquid material 36 is marked by a high viscosity in these cases and is e.g. a grease-like substance.

Further alternatively, a solid material 36 that is to be evaporated can be provided in the recesses 40.

Figure 7:
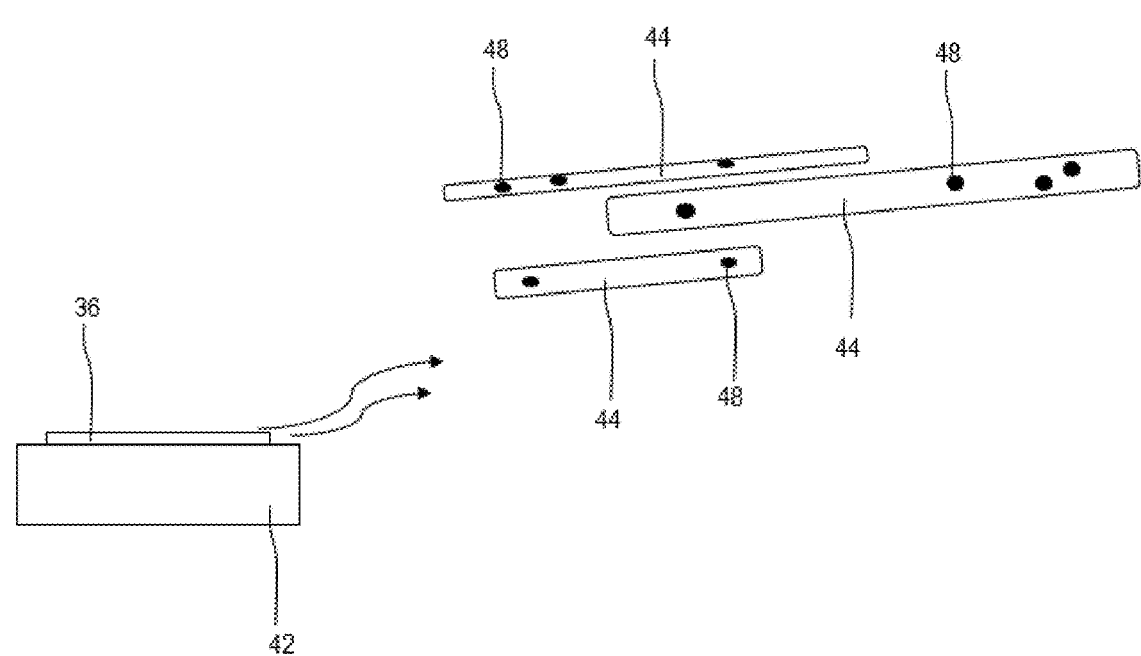
FIG. 7 is a schematic illustration of a working principle of the presently disclosed solution.
Figure 8:
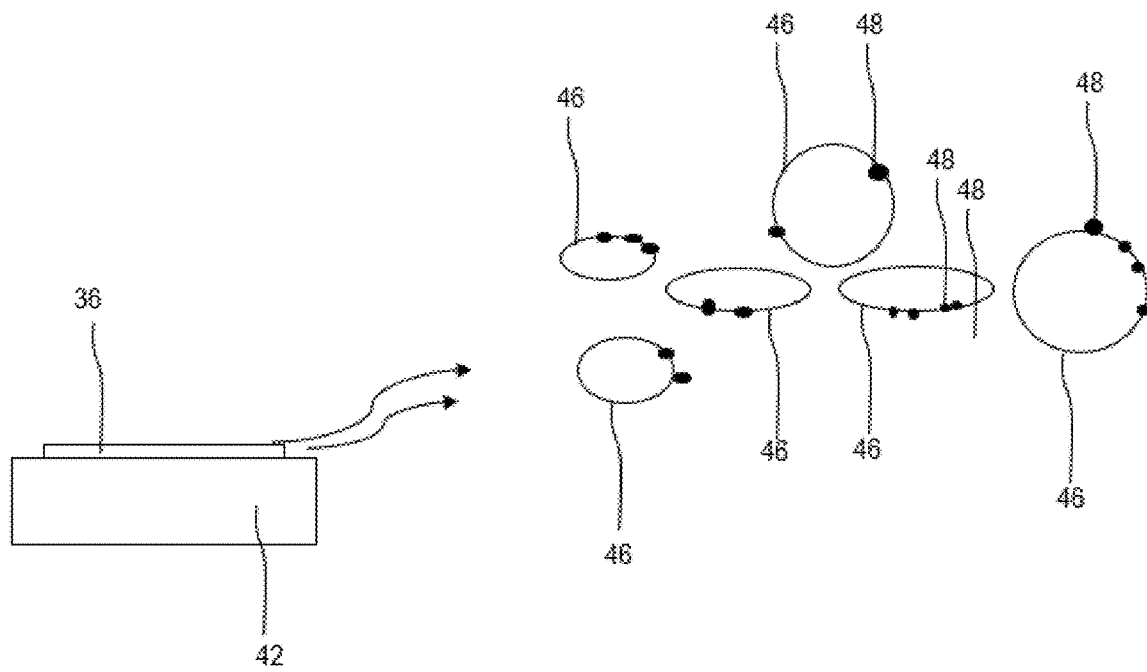
FIG. 8 is a schematic illustration of another working principle of the presently disclosed solution.

FIGS. 7 and 8 illustrate working principles of the presently disclosed solution. In both cases, a brake component 42 is schematically illustrated. Said brake component 42 may be any component of the vehicle wheel brakes 11 discussed with respect to the previous Figures. A layer of material 36 is deposited at one surface of the brake component 42.

By way of curved arrows, FIGS. 7 and 8 illustrate an evaporation of the material 36 when the brake component 42 warms up. This may occur after frequent brake activations and/or when hot air streams from the brake disc 16 stream along the material 36.

In case of FIG. 7, highly schematically illustrated vapour volumes 44 that e.g. form smoke-like trails are indicated. It has been found that fine brake dust particles 48 can be absorbed by said vapour volumes 44. The brake dust particles 48 are illustrated as filled-out dots and only some of them are marked by a respective reference sign. The absorbed brake dust particles 48 can jointly descend towards a road surface instead of being carried further away into the open nature and/or towards pedestrians.

In case of FIG. 8, highly schematically illustrated bubbles 46 are shown which are formed by the evaporating material 36. To the surface of said bubbles 46, brake dust particles 48 may adhere. The achieved effect is similar to the one of FIG. 7 explained above.

What is claimed is:

1. Vehicle wheel brake,
comprising a material that is configured to evaporate when operating the vehicle wheel brake,
wherein the material is configured to form bubbles when evaporating.

2. Vehicle wheel brake according to claim 1,
wherein an evaporation temperature of the material is between 100° C. and 300° C.

3. Vehicle wheel brake according to claim 1,
wherein the material is provided at an outwardly facing surface of the vehicle wheel brake and/or at a surface facing a brake disc of the vehicle wheel brake.

4. Vehicle wheel brake according to claim 1,
wherein the material is configured to form vapour or an aerosol when evaporating.

5. Vehicle wheel brake according to claim 1,
wherein the material is comprised by a local coating applied to at least one component of the vehicle wheel brake; or
wherein the material is comprised by a paint or a clear coat applied to at least one component of the vehicle wheel brake.

6. Vehicle wheel brake according to claim 1,
wherein the material is one of the following:
a fluoropolymer material;
a partial anodizing or hard anodizing coating.

7. Vehicle wheel brake according to claim 1,
wherein the material is a liquid material or a grease-like material and wherein the material is deposited in at least one reservoir of the vehicle wheel brake.

8. Vehicle wheel brake according to claim 7,
wherein the reservoir is arranged in and/or is formed by a recess that is comprised by at least one component of the vehicle wheel brake.

9. Vehicle wheel brake according to claim 7,
wherein the material is comprised by an adhesive member that is adhered at least one component of the vehicle wheel brake.

10. Brake component for a vehicle wheel brake,
wherein the brake component comprises a material that is configured to evaporate when operating the vehicle wheel brake, the brake component being one of:
a brake caliper housing,
a brake pad carrier,
a brake pad,
an electronic brake actuator, in particular a parking brake actuator,
wherein the material is configured to form bubbles when evaporating.

* * * * *